US 7,239,263 B1

(12) United States Patent
Sawa (10) Patent No.: US 7,239,263 B1
(45) Date of Patent: Jul. 3, 2007

(54) PLATFORM SHAKE COMPENSATION METHOD IN SYNTHETIC APERTURE PROCESSING SYSTEM

(75) Inventor: Takao Sawa, Yokosuka (JP)

(73) Assignee: Japan Agency for Marine-Earth Science and Technology, Kanagawa (JP)

( * ) Notice: Subject to any disclaimer, the term of this patent is extended or adjusted under 35 U.S.C. 154(b) by 0 days.

(21) Appl. No.: 11/501,754

(22) Filed: Aug. 10, 2006

(51) Int. Cl.
*G01S 13/90* (2006.01)
*G01S 15/89* (2006.01)
*G01S 7/40* (2006.01)
*G01S 13/00* (2006.01)
*G01S 15/00* (2006.01)

(52) U.S. Cl. .............. 342/25 F; 342/25 R; 342/25 A; 342/165; 342/173; 342/175; 342/195; 342/196; 367/12; 367/87; 367/88; 367/95; 367/103

(58) Field of Classification Search .......... 367/12, 367/87, 88, 92, 95–99, 103–105; 342/25 R–25 F, 342/82–103, 165–175, 190–197, 189
See application file for complete search history.

(56) References Cited

U.S. PATENT DOCUMENTS

| 4,034,370 | A | * | 7/1977 | Mims .................. 342/25 D |
| 4,244,036 | A | * | 1/1981 | Raven ................. 367/88 |
| 4,617,567 | A | * | 10/1986 | Chan .................. 342/25 A |
| 5,012,249 | A | * | 4/1991 | Chan .................. 342/25 A |
| 5,160,931 | A | * | 11/1992 | Brown ................. 342/25 C |
| 5,172,118 | A | * | 12/1992 | Peregrim et al. ....... 342/25 D |
| 5,172,119 | A | * | 12/1992 | Young et al. .......... 342/25 A |
| 5,172,120 | A | * | 12/1992 | Slawsby et al. ........ 342/25 D |
| 5,173,703 | A | * | 12/1992 | Mangiapane et al. .... 342/25 A |
| 5,185,608 | A | * | 2/1993 | Pozgay ................ 342/25 A |
| 5,189,424 | A | * | 2/1993 | Brown ................. 342/25 C |
| 5,760,732 | A | * | 6/1998 | Marmarelis et al. ..... 342/189 |
| 6,037,892 | A | * | 3/2000 | Nikias et al. ......... 342/25 F |
| 6,594,200 | B2 | * | 7/2003 | Nakamura ............. 367/88 |
| 6,870,499 | B2 | * | 3/2005 | Burns ................. 342/25 R |
| 6,912,176 | B2 | * | 6/2005 | Wazenski ............. 367/12 |
| 7,046,582 | B1 | * | 5/2006 | Kosalos et al. ........ 367/88 |
| 2002/0093880 | A1 | * | 7/2002 | Nakamura ............. 367/88 |

* cited by examiner

Primary Examiner—Bernarr E. Gregory
(74) *Attorney, Agent, or Firm*—Westerman, Hattori, Daniels & Adrian, LLP.

(57) ABSTRACT

The present information comprises the stages of: applying frequency analysis to positional information on a platform, generating virtual positional information on the platform based on a frequency analysis result; extracting a signal based on the generated virtual positional information; and performing a synthetic aperture processing based on the extracted signal, and in this manner, even if the positional information lacking in precision and inaccurate is used, the shake compensation of the platform in the synthetic aperture processing system can be effectively performed.

3 Claims, 12 Drawing Sheets

PREDETERMINED POSITION OF PLATFORM

REAL POSITION OF PLATFORM

FIG. 3(a)

NO SHAKE EXISTING

FIG. 3(b)

SHAKE EXISTING

GROUP OF RECEIVED REFLECTED WAVES

GROUP OF EXTRACTED PROCESSING SIGNALS

SIGNAL EXTRACT RANGE CALCULATED BY PLATFORM POSITION

PLATFORM SHAKE COMPENSATION METHOD IN SYNTHETIC APERTURE PROCESSING SYSTEM

BACKGROUND OF THE INVENTION

The present invention relates to a platform shake compensation method in a synthetic aperture processing system of radar or sonar.

Heretofore, in general, it is known that the shake of a platform mounting a synthetic aperture processing system adversary affects a synthetic aperture result. In the case of synthetic aperture radar using an electric wave, a moving velocity of the platform is far slower than a rate of propagation of an electric wave, so that the effect of the shake is small. Hence, if angle compensation and geometry compensation are performed in almost all the cases, a sufficiently detailed image can be acquired, and moreover, even in case the system is moved by an aircraft under bad weather, if the shake compensation is performed by using positional information by GPS (Global Position System) and INS (Inertial Navigation System), the situation can be coped with. However, in the case of synthetic aperture sonar using a sound wave, a moving velocity of the platform is relatively close to a rate of propagation of a sound wave, and moreover, it is often the case that an ocean wave gives to the platform a shake of a large vibration amplitude, and therefore, under the circumstances, it takes a lot more than the compensation used by the synthetic aperture radar to be sufficient to cope with the situation.

When the shake compensation method using the positional information is applied particularly to the synthetic aperture sonar, what becomes an issue is accuracy of the positional information. Accuracy of a position found by the synthetic aperture sonar is generally several centimeters to several tens of centimeters. However, accuracy of the position of the GPS is several meters or more, and accuracy of the position of the INS is unable to acquire accurate positional information independently due to its configuration. When shake compensation is performed by using inaccurate positional information, its position error also adversely affects the synthetic aperture result, and in case the position error is larger than the actual shake, the result after the compensation becomes much worse. At present, there is no measurement apparatus which can satisfy the positional accuracy required by the synthetic aperture sonar, and therefore, compensation processing is not effectively functioned. Hence, the synthetic aperture sonar under test working is limited to such extent of achieving a limited success in a lake or gulf where oceanographic phenomenon is mild and the shake of the platform is extremely little. Further, in the case of the synthetic aperture radar also, though the effect of the shake is little, it makes no difference as it still remains as a problem.

SUMMARY OF THE INVENTION

The present invention attempts at solving the above described problems, and an object of the invention is to allow shake compensation of the platform in the synthetic aperture processing system to be effectively performed even if the positional information lacking in precision and inaccurate is used. Hence, the present invention is characterized in that the positional information on the platform is applied with frequency analysis, and virtual positional information for shake compensation processing is generated, and based on the generated virtual positional information, a signal is extracted from a receiving reflected wave, so that it is applied with the synthetic aperture processing.

BEST MODE FOR CARRYING OUT THE INVENTION

Figure 1:
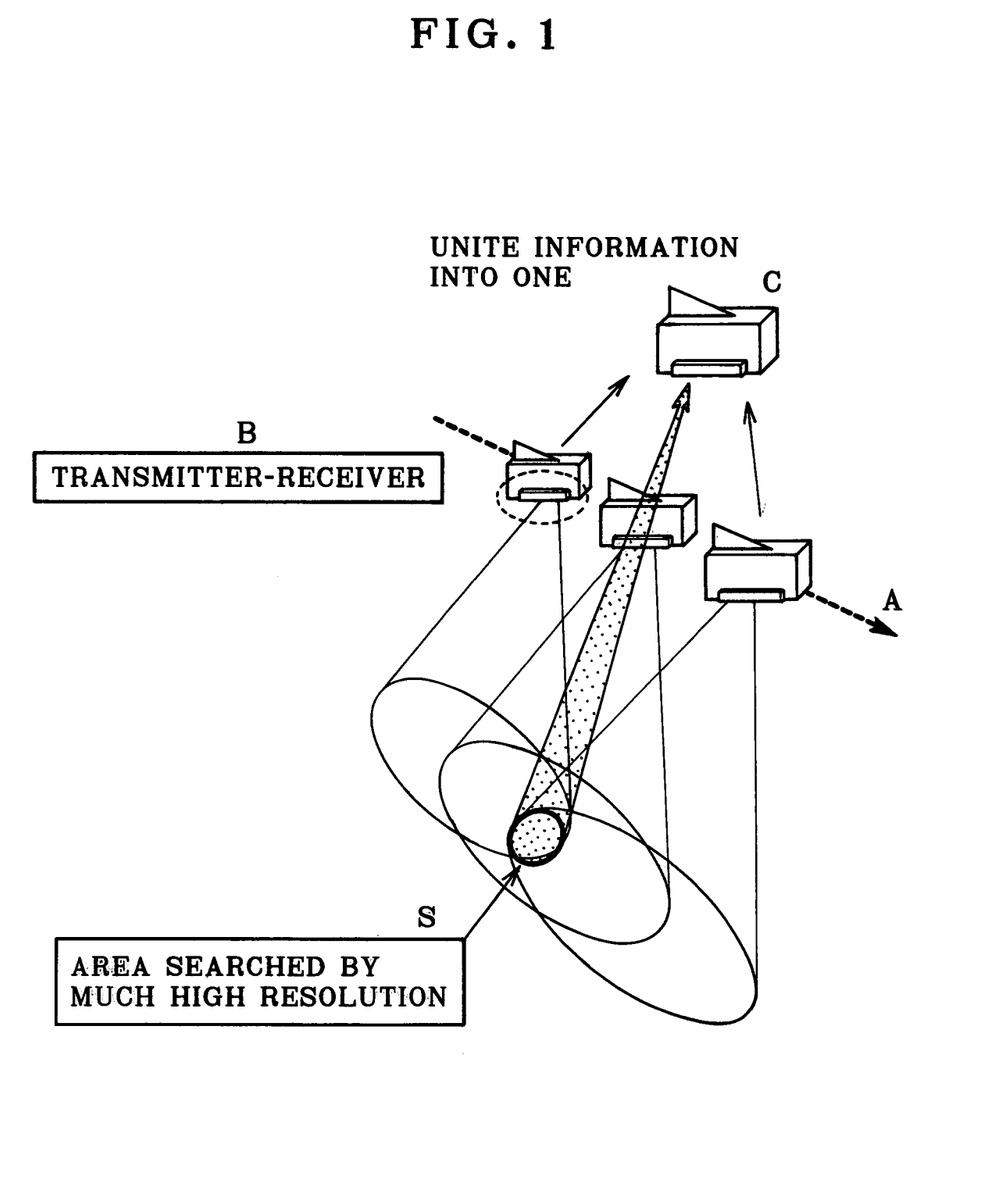
FIG. 1 is a conceptual illustration for explaining a synthetic aperture processing.

An embodiment of the present invention will be described below. FIG. 1 is a conceptual illustration for explaining a synthetic aperture processing. A common radar or sonar irradiates a scanning pulse signal in some direction, and measures how much strength of a reflected wave is returned within how many seconds later, thereby detecting a material body in that direction. At this time, the pulse irradiated to some search position is basically irradiated one time only. In contrast to this, in case the irradiation is performed by the synthetic aperture processing, as shown in FIG. 1, the scanning pulse signal is irradiated over and over again toward a search position S from a transmitter-receiver B, while moving in a direction to an arrow mark A, thereby recording the reflected wave at each movement zone. Then, the reflected waves measured at those positions are lumped together so as to increase an amount of information, which is processed on a computer C, thereby the research position is observed by much higher resolution.

Figure 2:
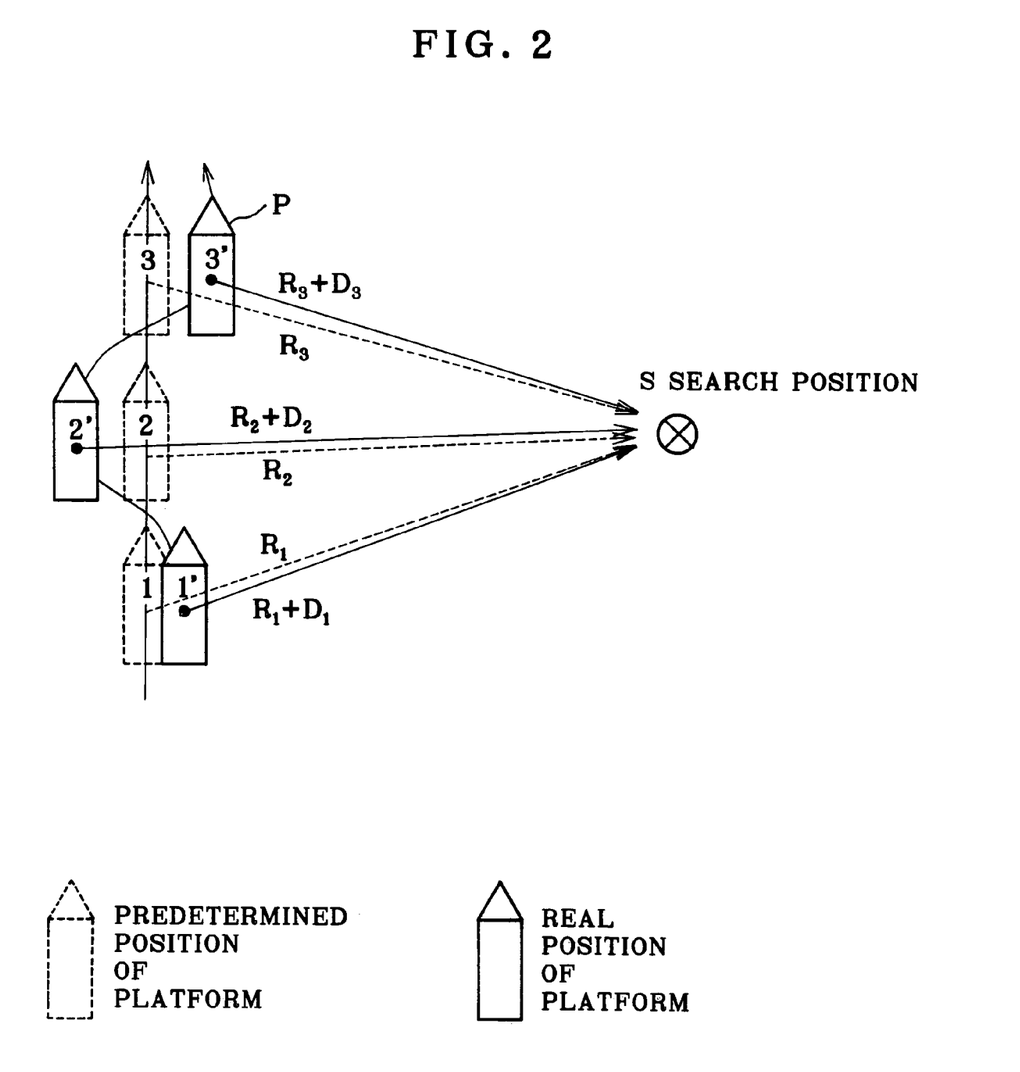
FIG. 2 is a view for explaining a shaken situation of a platform.

Thus, in the synthetic aperture processing, since a pulse is irradiated at the target, while moving, it is necessary to learn in what manner the pulse moves. Generally, the pulse linearly advances, while looking at the search position crosswise, but at this time, when there is disturbance such as ocean wave and the like, the platform shakes, and irradiation of the pulse at the predetermined position becomes impossible. FIG. 2 explains such situation.

In the synthetic aperture processing, while the processing is performed by putting a plurality of reflected waves in one lot, in the case of FIG. 2, three reflected waves are put together to perform the processing. The Figure expects that a platform P advances to 1, 2 and 3, while the pulse is irradiated at each position, but due to disturbance, the Figure shows a state in which the pulse has irradiated at 1', 2', and 3'. Because of the shake, the distance from the platform P to the search position S is increased (reduced) from $R_1$, $R_2$, and $R_3$, respectively, to $D_1$, $D_2$, and $D_3$, and it becomes $R_1+D_1$, $R_2+D_2$, and $R_3+D_3$.

By such increase and decrease of the distance, the reflected wave to be received also gets out of order from the estimated time. In the synthesizing aperture processing, this delay time is anticipated, and though the operation for taking out a part of the reflected wave signal to be processed is performed, when the effect of the shake is incurred, the delay time is changed, and the signal to be extracted is also shifted, and as a result, the synthesizing aperture processing is adversely affected. FIG. 3 shows this state.

Figure 3A:
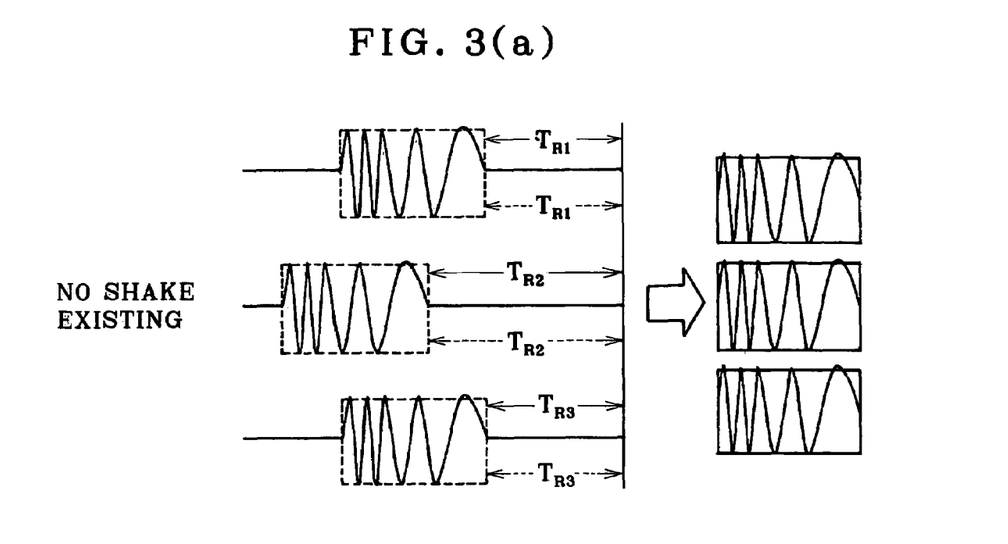
FIG. 3 is a view for explaining a shift of a processing signal due to platform shake.
Figure 3B:
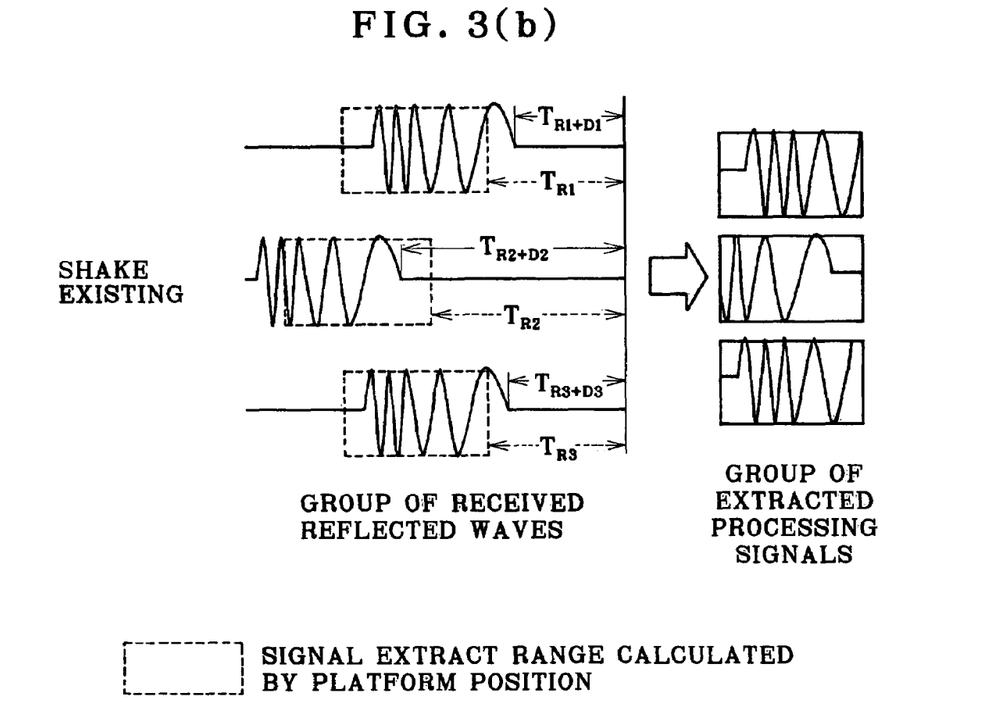

FIG. 3A shows the case where there is no shake in the platform and the delay time of the reflected wave received at each movement zone is taken as $TR_1$, $TR_2$, and $TR_3$. In the synthetic aperture processing, this delay time is calculated so as to extract necessary signals, and in case there is no shake, wave forms are aligned, and can be extracted. However, as shown in FIG. 3B, in case there is a shake, the delay times of the signals actually to be extracted become $TR_1+D_1$, $TR_2+D_2$, and $TR_3+D_3$, and therefore, when the delay times of the reflected waves are extracted as $TR_1$, $TR_2$, and $TR_3$, the signals to be extracted are shifted with a result that the synthetic aperture processing is performed by using erroneous signals.

Hence, if an accurate position of the platform is measured and an accurate delay time of the reflected waves is re-calculated so that the waveforms can be extracted, then, similarly to the case where there is no shake, the synthetic aperture processing can be performed with aligned waveforms. This is a principle of the shake compensation using the positional information, and this is represented in the drawing by FIG. 4.

Figure 4:
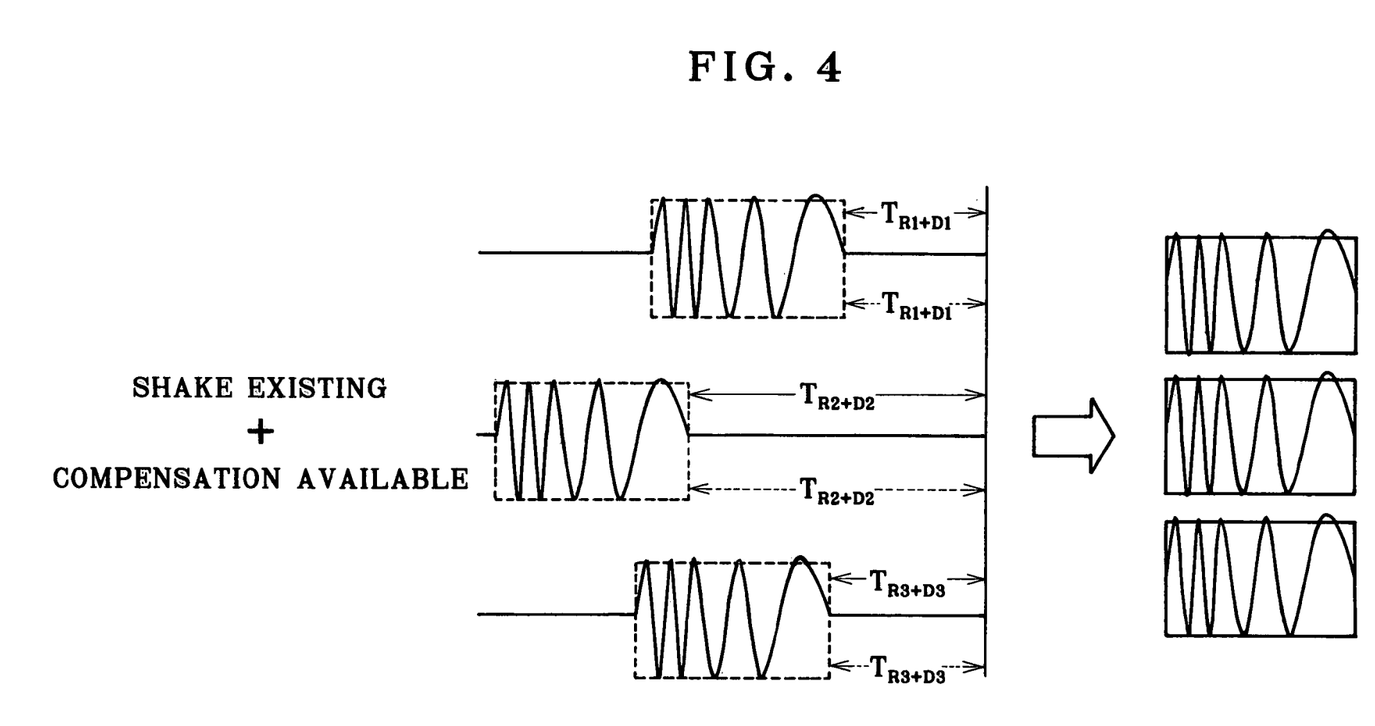
FIG. 4 is a view for explaining a principle of a shake compensation using the positional information.

In FIG. 4, when the delay time of the signal in each position due to effect of the shake becomes $TR_1+D_1$, $TR_2+D_2$, and $TR_3+D_3$, respectively, the range extracted by measuring the position of the platform is also based on $TR_1+D_1$, $TR_2+D_2$, and $TR_3+D_3$, so that the approximately same signals as the case where there is no shake can be extracted. This allows the effect of giving the shake to the synthetic aperture processing to be confined to the minimum. The reason why the expression of "confined to the minimum" is used here is because it is not that the irradiating pulse is compensated. The pulse irradiated from a different place by the shake is essentially different from the pulse irradiated from the original place, and it is physically impossible to compensate that pulse after irradiation.

Figure 5:
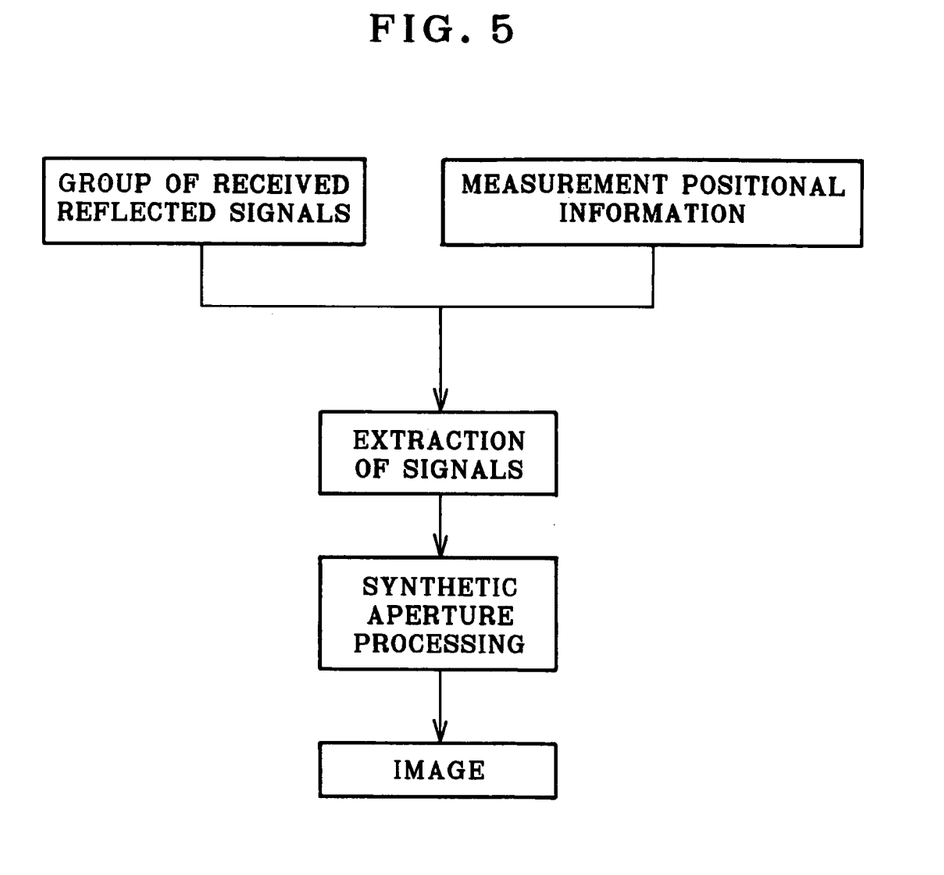
FIG. 5 is a view showing a processing flow of the shake compensation using the positional information.

FIG. 5 is a view showing a processing flow of the shake compensation using such positional information, in which the delay time of a group of received reflected signals is calculated by using the measurement positional information on the platform, and required signals are extracted, and the synthetic aperture processing is performed in like manner to the case where there is no shake, thereby acquiring the image of the search position.

Figure 6:
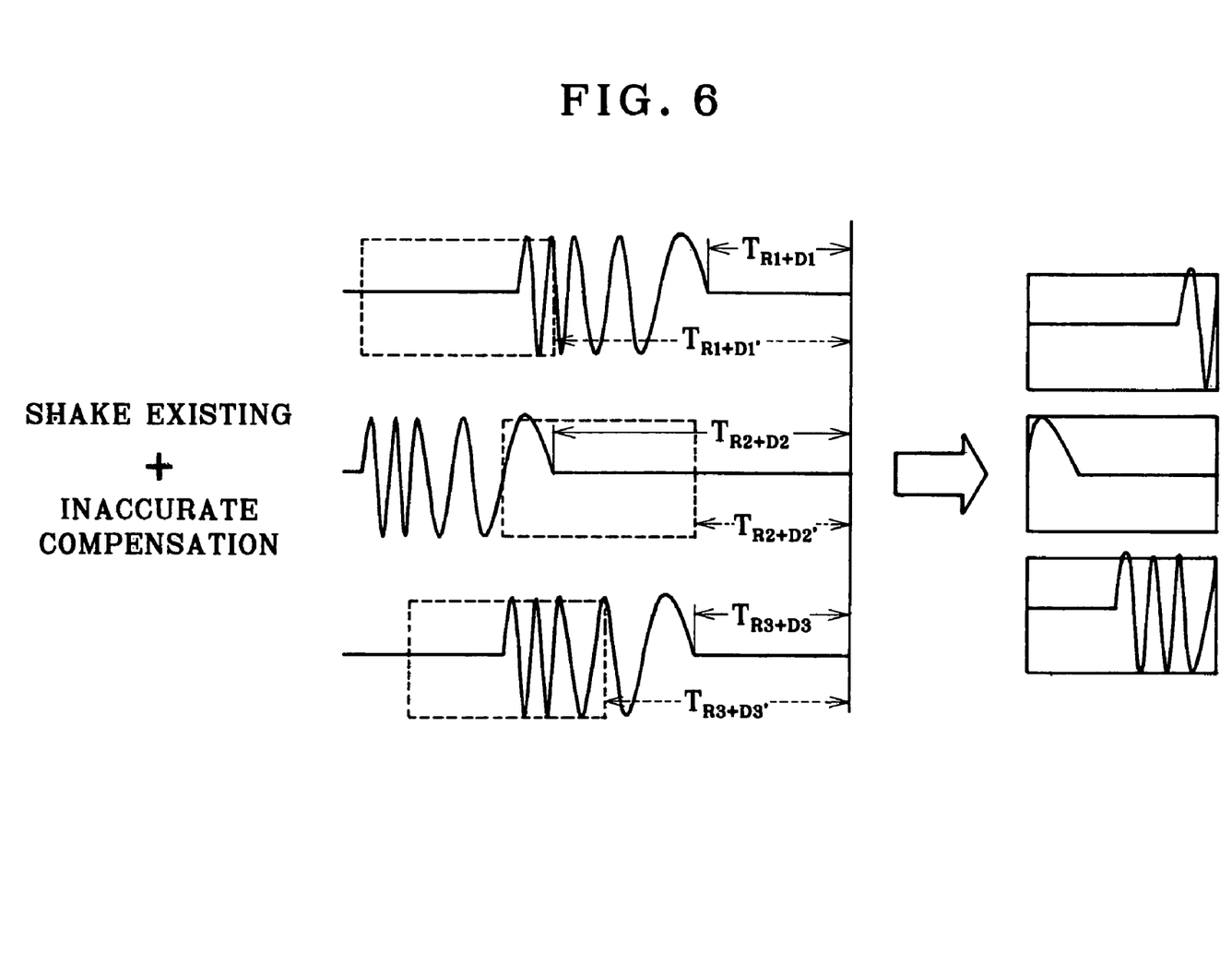
FIG. 6 is a view showing an example in which a synthetic aperture result becomes worse prior to the compensation performed before due to shake compensation.

In case the synthetic aperture processing is performed by using such positional information, accuracy of the positional information becomes very important. For example, when the acquired positional information is inaccurate, it is often the case that the result of the shake compensation performed is worse than the compensation performed before, which is shown in FIG. 6.

Assume that, although the range to extract the reflected signals by using the positional information is supposed to take $TR_1+D_1$, $TR_2+D_2$, and $TR_3+D_3$ as a reference, because of the inaccurate positional information, it turns out to be $TR_1+D_1'$ $TR_2+D_2'$ and $TR_3+D_3'$. If the differences between the measured positions and the present positions, $D_1'-D_1$, $D_2'-D_2$ and $D_3'-D_3$, are larger than the positional differences $D_1$, $D_2$, and $D_3$ shifted by the shake, the range to be extracted is further shifted, and the synthetic aperture processing result becomes also worse. Positioning accuracy required not to give any effect to the result of the synthetic aperture processing is said to be generally approximately one tenth of operating wavelength.

Heretofore, to improve compensation effect, it has been believed that there is no other way than raising measuring accuracy. Hence, it has been deemed important to bring positional information close to a real position as much as possible. However, accuracy of positional measurement of a mobile body in the present technology is approximately 1 m even if, for example, the GPS is used, which is one of the most excellent measuring apparatuses available. However, for example, even if a wavelength of the wave used by the sonar is long, it is approximately 10 cm, and the required measurement accuracy is 1 cm below one tenth of that wavelength. Hence, accuracy of the positional information is basically not enough, and particularly, in the field of the sonar, it is far cry from acquiring a good result by the compensation using the positional information as it is.

Thus, heretofore, it has been deemed important for improvement of the compensation processing to use the measurement positional information close to a real position as much as possible. However, according to the research works conducted so far by the present inventor and others, it is found that it is not exactly so. In a water vessel experiment conducted by the present inventor and others, it is found that, even if a shift amount of shake is the same, in case its frequency is different, the result brings about a large difference.

Figure 7A:
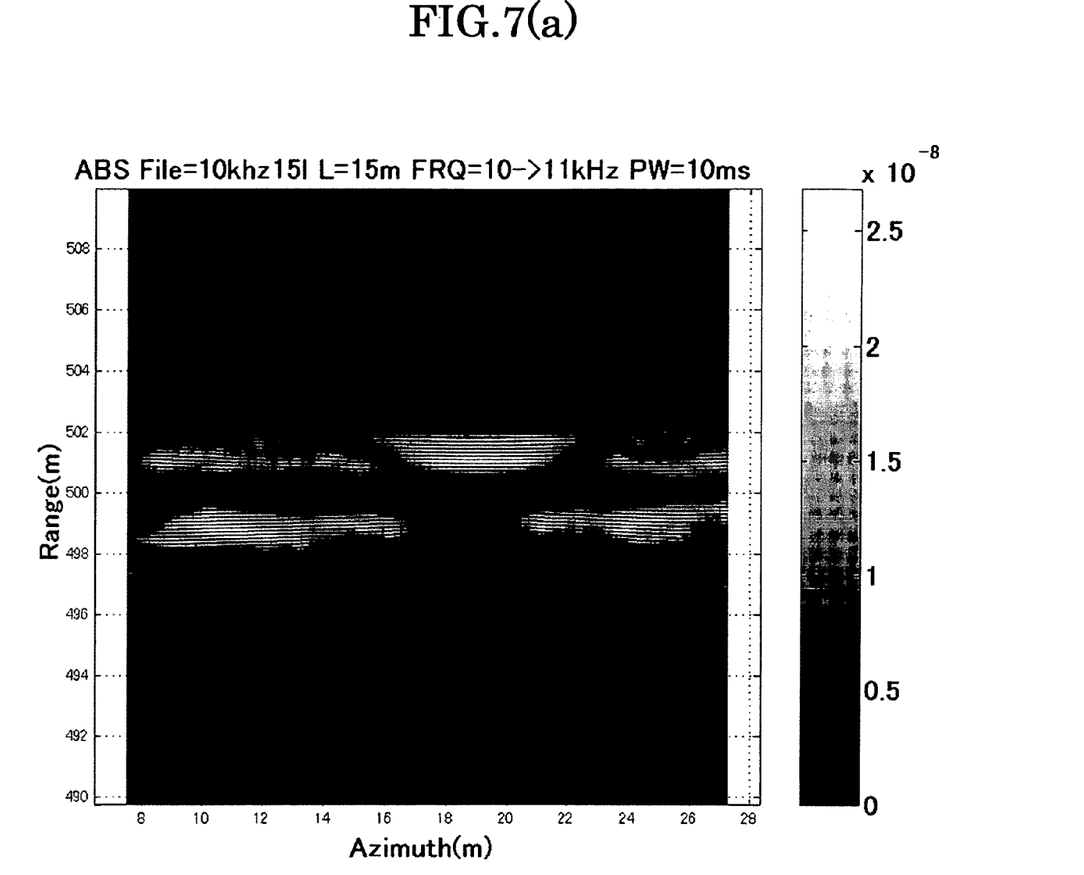
FIG. 7 is a view showing a compensation simulation result using information on some frequency band.
Figure 7B:
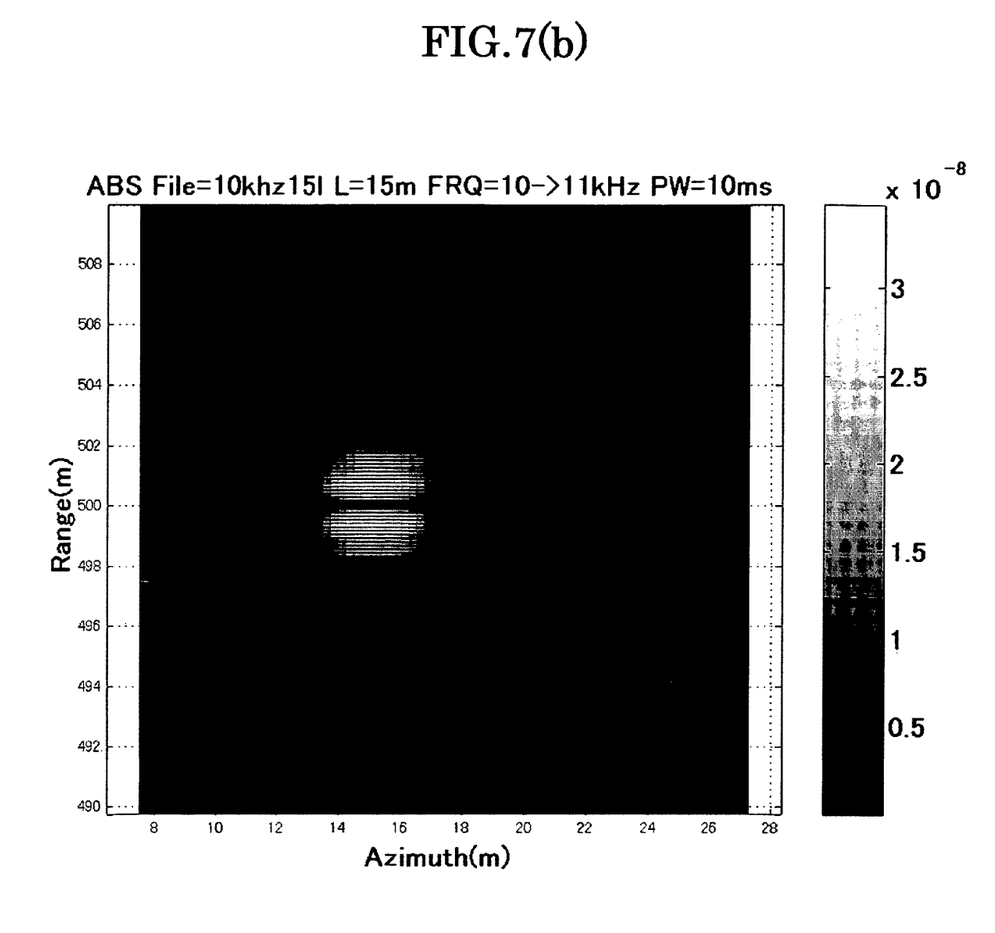

Further, in case the shake compensation is performed by using the positional information, even if accuracy of the positional information is inferior as a whole, if high precision information in some frequency band is included, it is found that even the compensation using the information on that band only can acquire an effective compensation effect. The simulation result thereof is shown in FIGS. 7(a) and 7(b).

In the simulation, one point target 500 m away in a horizontal distance is observed by the synthetic aperture sonar of pulse width 10 ms, pulse central frequency 10.5 kHz, and pulse band 1 kHz. A synthetic aperture length at this time is 15 m, and a platform velocity is 0.25 m per sec, a transmission pulse interval is 1 sec, and a sound velocity is 1500 m per sec.

The platform is shaking in a target direction, and the amplitude is 3 m pp, and the shakes of 0.1 Hz and 0.01 Hz in frequency are added at the same time. The axis of abscissa of the FIG. 7 represents relative positions in the advancing direction (azimuth direction) of the target for the platform, and the axis of ordinate represents the absolute distances toward the target in a vertical direction (range direction) for the platform advancing direction, which is just an image looking down the target from the above. FIG. 7(a) shows a shake before the compensation of the shake, and FIG. 7(b) shows a result of having compensated for the shake only of 0.01 Hz. In FIG. 7(b), since there remains the effect of the shake of 0.1 Hz and 3 m pp as it is, there remains the shake even 300 times 1 cm which is one tenth of the wavelength required as positional measurement accuracy. However, it is found that the result is greatly improved, comparing with the result before the compensation.

In view of the above-described facts, in the present invention, first, the platform position is measured by using the known means, and the shake of a position is applied with a frequency analysis. Then, the calculation is performed based on the analyzed frequency area (there may be the case of a single frequency or the case where plural frequency components are overlapped), and virtual positional information (virtual trail) on the platform is generated. Then, based on the generated virtual information, the delay time of the reflected wave at each position of the platform is calculated, and necessary signals are extracted from the reflected wave to perform the synthetic aperture processing. By such processing, a shake frequency area, distance to the search target, synthetic aperture length, frequency of sound wave, and the like are changed, and by simulation, the shake frequency area where a result of the synthetic aperture processing is most improved beforehand is found, and it is carried as data base. In case the shake compensation is performed, the shake frequency area most suitable for the given conditions (distance to the search target, synthetic aperture length, frequency of sound wave and the like) is found by referring to the database, and based on this frequency area, the virtual positional information on the platform is generated, and based on the generated virtual information, the delay time of the reflected wave is calculated, so that the signal is extracted and the synthetic aperture processing is performed. In this case, the virtual information comes not necessarily close to a real position, and this point is characteristic of the present invention, and is essentially different from the conventional method.

Embodiment

Figure 8:
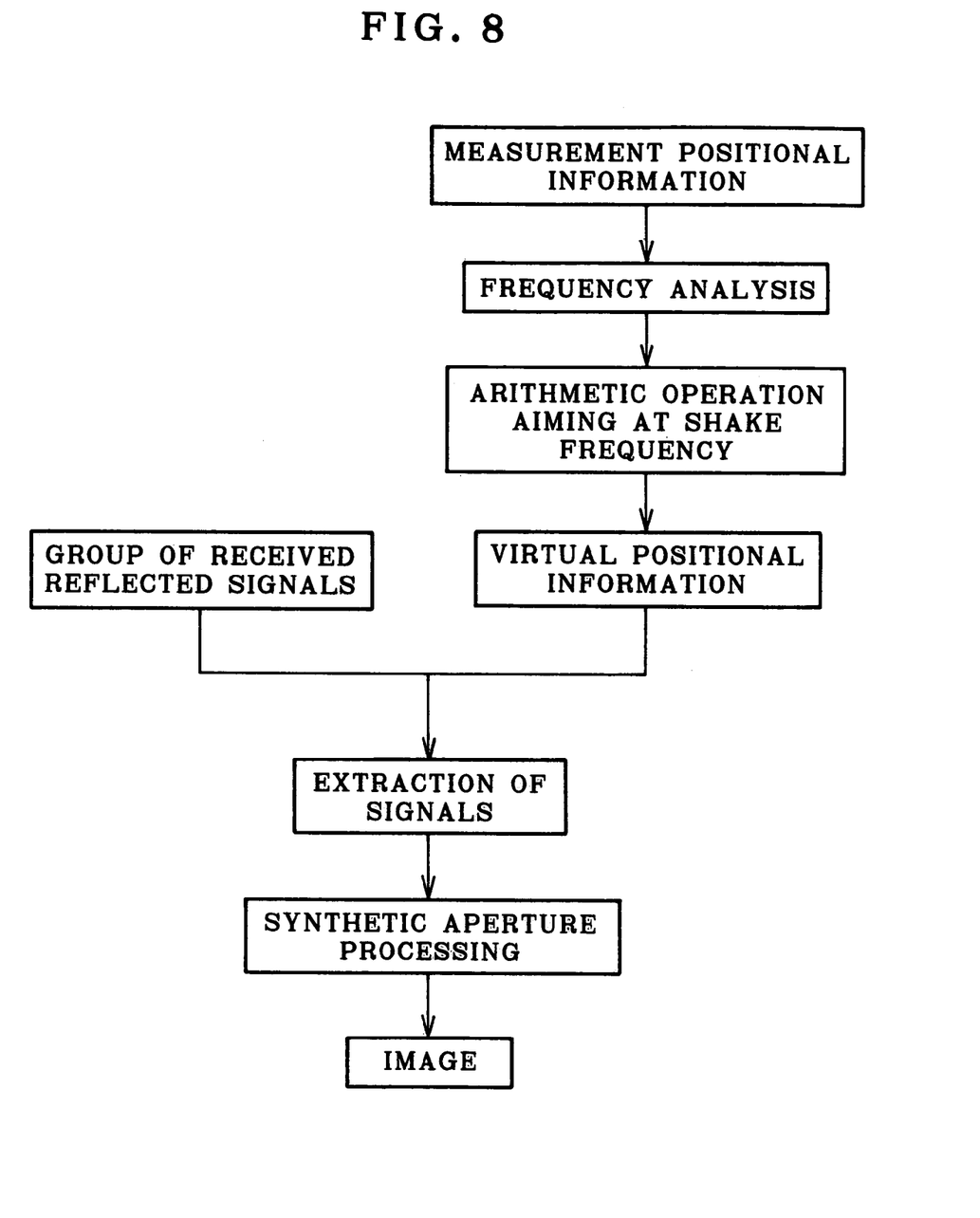
FIG. 8 is a view showing a processing flow of the shake compensation.

FIG. 8 is a view showing a processing flow of the present invention. First, a position of the platform is measured by using the known means, and measurement positional information is applied with frequency analysis by the known Fourier transformation and Wavelet transformation. Then, by referring to the database found in advance, an arithmetic operation is performed by aiming at the most appropriate frequency area, and virtual positional information on the platform is generated. Then, from the virtual positional information, the delay time of the reflected wave is calculated, and necessary signals are extracted from the received reflected wave, and the synthetic aperture processing is performed, thereby acquiring the target image information.

Figure 9A:
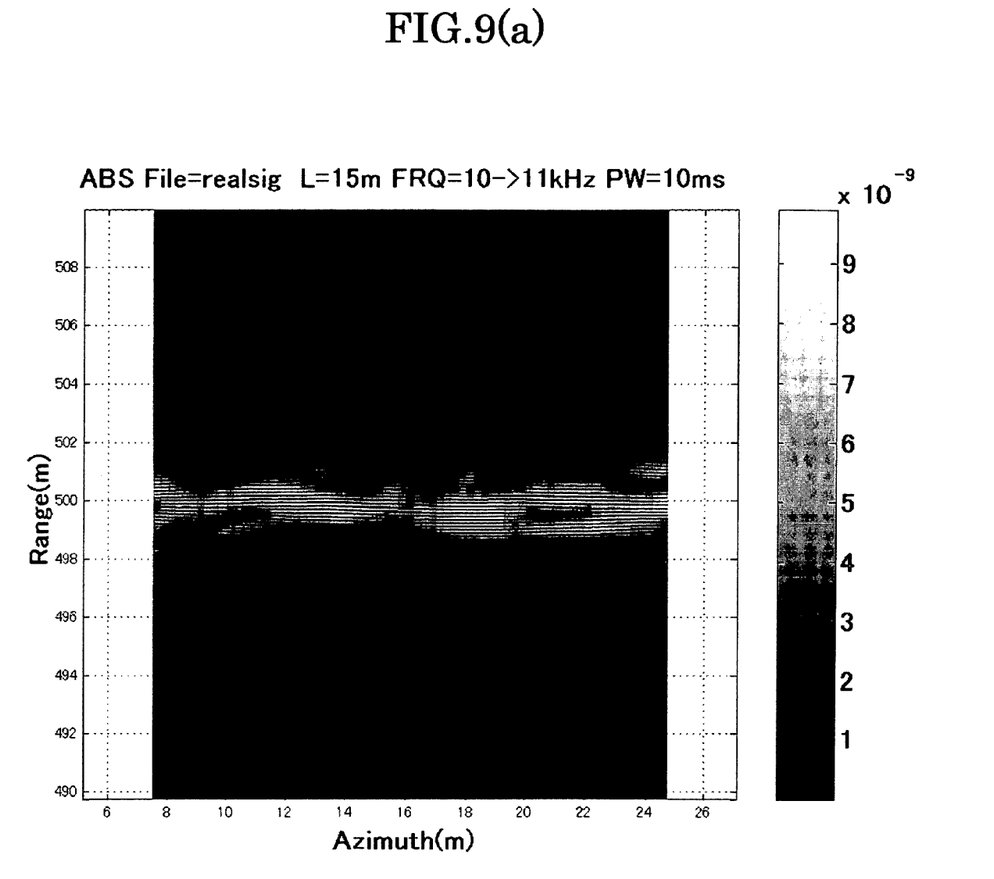
FIG. 9 is a view for comparing the results of the shake compensation.
Figure 9B:
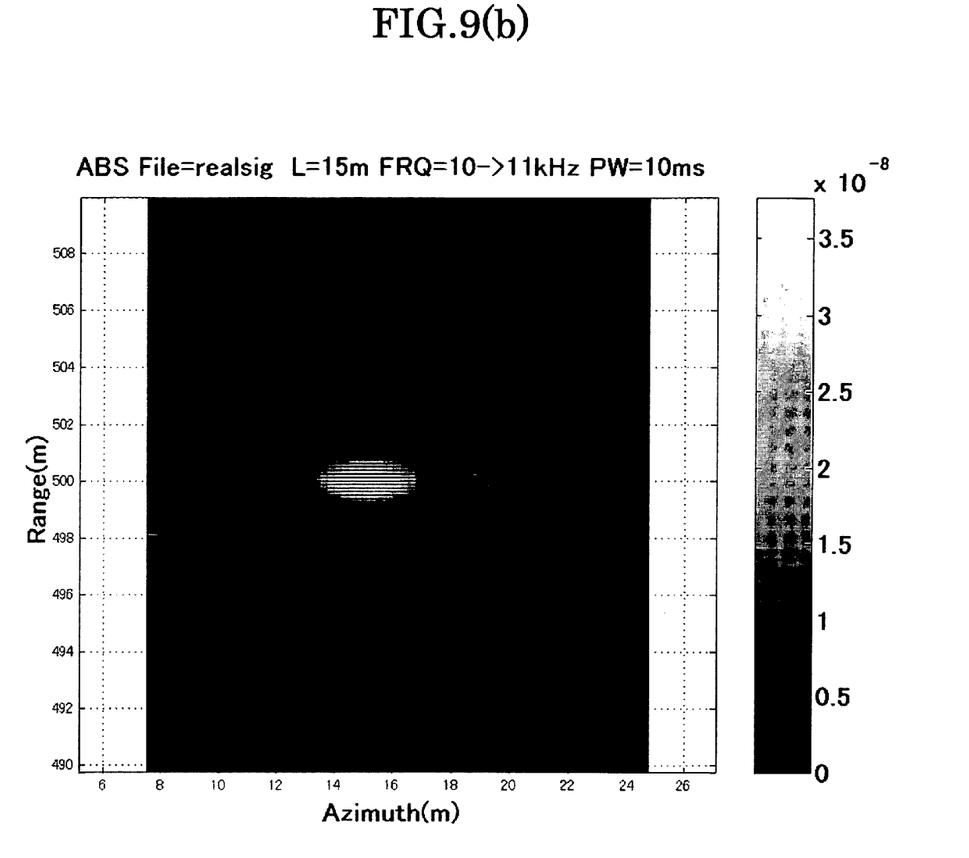
Figure 9C:
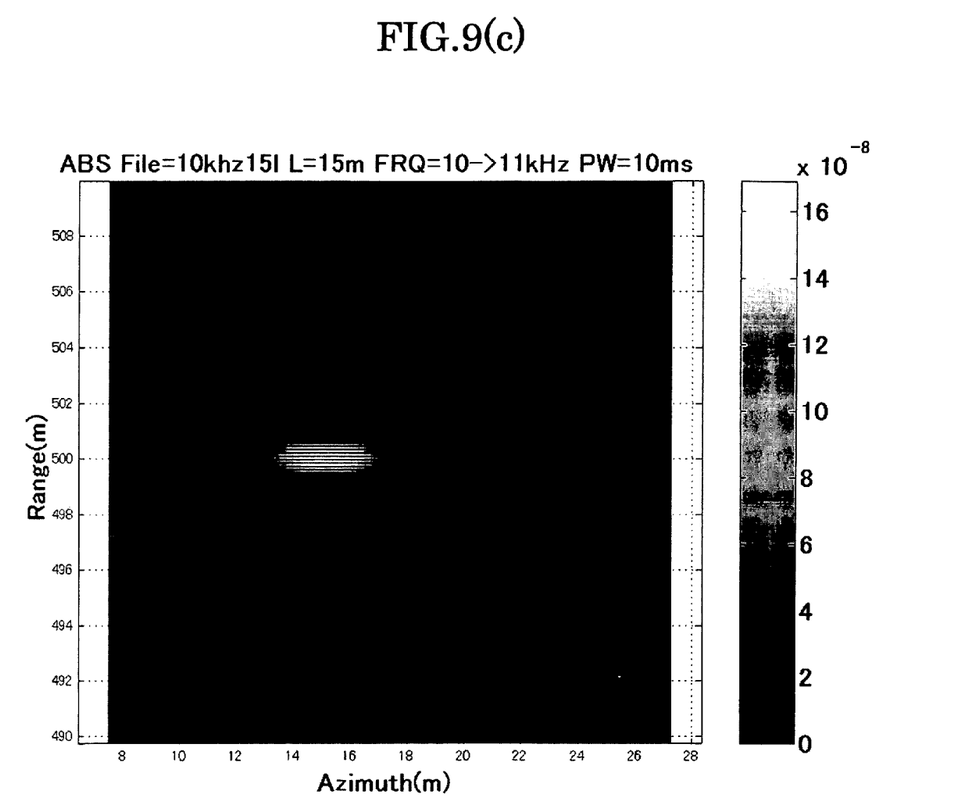

Those which compare the conventional shake compensation and a result of the shake compensation method based on the processing flow of FIG. 8 are FIG. 9(a) and FIG. 9(b). The target is one point target 500 m away in a horizontal direction in like manner to the above-described simulation, and the operating condition of the synthetic aperture sonar is quite the same. The axis of abscissa of the Figure represents relative positions in the advancing direction (azimuth direction) of the target for the platform, and the axis of ordinate represents the absolute distances toward the target in a vertical direction (range direction) for the platform advancing direction, which is just the same as the case of FIG. 7 in that it is an image looking down the target from the above. The platform is shaking in a direction to the target, and its amplitude is 1 mpp, and the frequencies are 0.1 Hz and 0.01 Hz. The positional information used for compensation is intentionally added with disturbance, thereby derogating the precision. For reference, in FIG. 9(c) is shown a result of the case where there is no shake available.

In the arithmetic operation performed aiming at the shake frequency at this time, a processing for removing a high frequency component of the positional information is performed. This is because, as a result of the frequency analysis of the positional information, it is found that there is a relatively large deterioration of precision in the frequency component. Since, in the course of the processing, the positional information on the real shake is also partially removed, the generated virtual information is information partially lacking in the real positional information, and includes a difference of more than one tenth of the wavelength. As evident from the comparison between FIG. 9(b) and FIG. 9(c), it is found that approximately the same image as the case where there is no shake is acquired by the shake compensation method of the present invention.

According to the present invention, an industrial applicability is high since the shake compensation of the platform in the synthetic aperture processing system can be effectively performed.

What is claimed is:

1. A platform shake compensation method in a synthetic aperture processing system, comprising the stages of:
    applying frequency analysis to positional information on said platform;
    generating virtual positional information on a platform based on a result of said frequency analysis;
    extracting a signal from a received reflected wave based on the generated virtual positional information; and
    performing a synthetic aperture processing based on the extracted signal.

2. The shake compensation method according to claim 1, wherein said frequency analysis is performed by Fourier transformation.

3. The shake compensation method according to claim 1, wherein said frequency analysis is performed by Wavelet transformation.

* * * * *